(12) United States Patent
Sousa et al.

(10) Patent No.: US 6,606,331 B2
(45) Date of Patent: Aug. 12, 2003

(54) STEP-TUNABLE ALL-FIBER LASER APPARATUS AND METHOD FOR DENSE WAVELENGTH DIVISION MULTIPLEXED APPLICATIONS

(75) Inventors: João M. Sousa, Valongo (PT); Francisco M. Araújo, Porto (PT); Paulo T. Guerreiro, Estoril (PT); Luis A. Ferreira, Vila Nova de Gaia (PT); Antonio Lobo Ribeiro, Maia (PT); José R. Salcedo, Porto (PT)

(73) Assignee: Multiwave Networks Portugal, Lda., Moreira da Maia (PT)

( * ) Notice: Subject to any disclaimer, the term of this patent is extended or adjusted under 35 U.S.C. 154(b) by 0 days.

(21) Appl. No.: 09/900,150

(22) Filed: Jul. 9, 2001

(65) Prior Publication Data

US 2003/0007541 A1 Jan. 9, 2003

(51) Int. Cl.[7] .................................................. H01S 3/13
(52) U.S. Cl. ........................ 372/32; 372/29.02; 372/94; 372/98
(58) Field of Search .............................. 372/94, 19, 25, 372/30, 98, 18, 6, 20, 29, 2

(56) References Cited

U.S. PATENT DOCUMENTS

| | | | |
|---|---|---|---|
| 5,132,976 A | * | 7/1992 | Chung et al. .................. 372/20 |
| 5,191,586 A | | 3/1993 | Huber |
| 5,212,711 A | * | 5/1993 | Harvey et al. ................. 372/94 |
| 5,440,417 A | | 8/1995 | Chung et al. |
| 5,524,118 A | | 6/1996 | Kim et al. |
| 5,666,372 A | | 9/1997 | Ball et al. |
| 5,910,962 A | | 6/1999 | Pan et al. |
| 6,041,070 A | | 3/2000 | Koch et al. |
| 6,061,369 A | | 5/2000 | Conradi |
| 6,091,744 A | | 7/2000 | Sorin et al. |
| 6,097,741 A | * | 8/2000 | Lin et al. ....................... 372/6 |
| 6,148,011 A | | 11/2000 | Larose et al. |
| 6,163,553 A | | 12/2000 | Pfeiffer |

* cited by examiner

Primary Examiner—Leon Scott, Jr.
(74) Attorney, Agent, or Firm—Hunton & Williams LLP

(57) ABSTRACT

A fiber-optic laser source capable of emitting one useful wavelength at a given time, electrically step-tunable to the ITU grid wavelengths, is disclosed. The laser preferably comprises a diode-pumped rare-earth doped fiber amplifier as gain medium, a periodic filter to define ITU grid lasing wavelengths, and a tunable filter electrically step tunable to any wavelength defined by the periodic filter. The arrangement is enclosed in a ring single mode optical fiber resonator. The ring resonator may be made, in part or in total, with polarization-maintaining optical fiber. The resonator also comprises in-line optical isolators to ensure unidirectional operation and to eliminate undesired reflections. A polarization controller and polarizer device and a gain-flattening filter may also be included within the resonator depending on the desired output characteristics of the laser. The laser may be designed to operate in single cavity longitudinal mode. The disclosed fiber-optic laser may also comprise output wavelength and/or power definition and stabilization control.

43 Claims, 6 Drawing Sheets

STEP-TUNABLE ALL-FIBER LASER APPARATUS AND METHOD FOR DENSE WAVELENGTH DIVISION MULTIPLEXED APPLICATIONS

TECHNICAL FIELD OF THE INVENTION

This invention relates to step-tunable fiber lasers and, more specifically, to step-tunable fiber lasers for dense wavelength division multiplexed (DWDM) applications. It also pertains to methods by which such lasers may be made to operate.

BACKGROUND OF THE INVENTION

A known method for increasing the capacity of a fiber optic communication system is wavelength division multiplexing, or WDM. WDM increases capacity by permitting the use of more than one optical carrier on a single fiber. WDM is accomplished by multiplexing the outputs of more than one laser onto the fiber. After transmission, at the receiving end, the multiple wavelengths are demultiplexed.

The concepts behind WDM have been extended to use a set of closely-spaced wavelengths in the 1550 nm window. The International Telecommunication Union (ITU) has proposed the use of a grouping or grid of wavelengths in this window. The channels are anchored to a reference at 193.10 THz and equally spaced in frequency, the closely spaced grids having channels 100 GHz or 50 GHz apart. In the wavelength range between 1528.77 nm and 1560.61 nm, the ITU 100 GHz grid comprises 41 channels. This method of WDM is known as dense wavelength division multiplexing, or DWDM.

Communication systems to implement this scheme thus must have laser sources which have emissions at each of the grid wavelengths. This could be accomplished by having a multitude of different laser sources, each having an emission wavelength corresponding to a respective one of the grid wavelengths. It would be far more convenient, cost-effective, and efficient, however, to have the capability of producing different wavelengths without having to correspondingly increase the number of different laser sources. A single laser source capable of having an emission wavelength set or tuned to any of the ITU grid wavelengths is therefore desirable. This type of laser source would also prove advantageous in sparing and hot sparing configurations for DWDM, and would allow for reconfigurable DWDM optical communication networks and network elements. For DWDM applications the laser source need not be continuously tunable, being that a step-tunable laser source would offer superior performance while, in general, be of simpler implementation. Such an apparatus should be tunable across the widest possible wavelength range, preferably across the whole ITU grid, and provide high optical output power across its whole wavelength operating range.

SUMMARY OF THE INVENTION

These and other desirable ends are met in the present invention through provision of an apparatus comprising a pump module for generating pump radiation, a ring laser resonator, an input coupler for optically coupling the pump radiation into the laser resonator, and an output coupler for optically coupling laser radiation out of the laser resonator. The laser resonator itself preferably includes an optically-coupled arrangement of a gain module which is pumped by the pump radiation, the pump radiation exciting the gain module thereby achieving lasing action in the laser resonator, a periodic filter, and a tunable filter.

The gain module, the periodic filter and the tunable filter may be optically coupled using single-mode optical fiber or polarization maintaining single-mode optical fiber.

The gain module preferably comprises an optical amplifier, which may be an erbium-doped fiber amplifier. The periodic filter may be a transmission filter which may be a fiber or fiber-coupled Fabry-Pérot micro-etalon filter. The periodic filter may alternatively be a reflection filter, which may be a sampled fiber Bragg grating or a set of sampled fiber Bragg gratings. Either way, the periodic filter preferably has spectral characteristics defined according to the ITU grid wavelengths. The periodic filter may be tunable, either electrically or mechanically tunable.

The tunable filter is preferably electrically tunable. It may comprise a fiber tunable filter or a fiber-coupled tunable filter, or, more specifically, a fiber Fabry-Pérot filter or a fiber-coupled Fabry-Pérot filter.

The laser resonator may also include means for ensuring unidirectional laser oscillation. The means for ensuring unidirectional laser oscillation may be an optical isolator positioned at one end of the gain module. Also, the gain module may include means for preventing reflections from other resonator components from disturbing laser emission, which may be a second optical isolator positioned at the opposite end of the gain module relative to the optical isolator used for ensuring unidirectional laser oscillation.

The resonator may also include a wavelength dependent filter having a spectral loss characteristic complementary to and compensating for the gain profile of the gain module so that a net gain of the gain profile and the loss characteristic is approximately constant across the laser operating wavelength range.

The resonator may also include means for preventing inter-etalon interactions between the periodic filter and the tunable filter. These means may be an optical isolator. The resonator may also include a polarization controller and polarizer.

The input coupler preferably comprises a fiber-fused wavelength division multiplexer and the output coupler preferably comprises a fiber-fused coupler. The pump module preferably comprises at least one pump laser diode or multiple pump laser diodes arranged according to a pump redundancy scheme.

The apparatus may also include means for locking of the periodic filter spectral response, which may be a wavelength reference control module. The wavelength reference control module may be made up of a fiber-fused coupler, a photodetector, and a wavelength reference filter. The wavelength reference filter may be a temperature-compensated fiber Bragg grating.

The apparatus may also include means for definition and stabilization of laser oscillation wavelength, which may be a laser wavelength control module. The laser wavelength control module may be made up of a fiber-fused coupler and a photodetector.

The apparatus may also include means for definition and stabilization of laser output power, which may be a laser output power control module. The laser output power control module may be made up of a fiber-fused coupler, a calibrated photodetector and an electrically variable optical attenuator.

The invention resides in part in the overall apparatus and in a resonator per se made up of a gain module, a periodic filter optically coupled to the gain module, and an electrically tunable filter optically coupled to the periodic filter.

The invention is also embodied in a method of generating a laser output at any one of a set of discrete frequencies, the method comprising the steps of providing pump energy to a gain medium in a laser cavity to excite a laser resonance, filtering the laser resonance using a periodic filter to limit the possible frequencies to the frequencies in the set, filtering the laser resonance using a tunable filter to limit the possible frequencies to one of the frequencies in the set, and tuning the tunable filter to select one of the frequencies in the set as an output frequency.

The invention is further embodied in a method of locking a spectral response of a periodic filter, the method comprising the steps of providing a fraction of radiation in a laser cavity to illuminate a stabilized wavelength reference filter, monitoring the stabilized wavelength reference filter response with a photodetector, controlling the spectral response of the periodic filter by means of a loop control unit, and operating the loop control unit in a closed-loop operation.

The invention is additionally embodied in a method of defining and stabilizing an output wavelength of a laser, the method comprising the steps of providing a fraction of the radiation in a laser cavity to illuminate a photodetector, controlling the spectral response of the tunable filter by means of a loop control unit, and operating the loop control unit in a closed-loop operation.

Also, the invention is additionally embodied in a method of defining and stabilizing the output power of a laser, the method comprising the steps of providing a fraction of the radiation in a laser output to illuminate a calibrated photodetector, controlling a variable optical attenuator insertion loss by means of a loop control unit, and operating the loop control unit in a closed-loop operation.

DETAILED DESCRIPTION OF PREFERRED EMBODIMENTS

Figure 1:
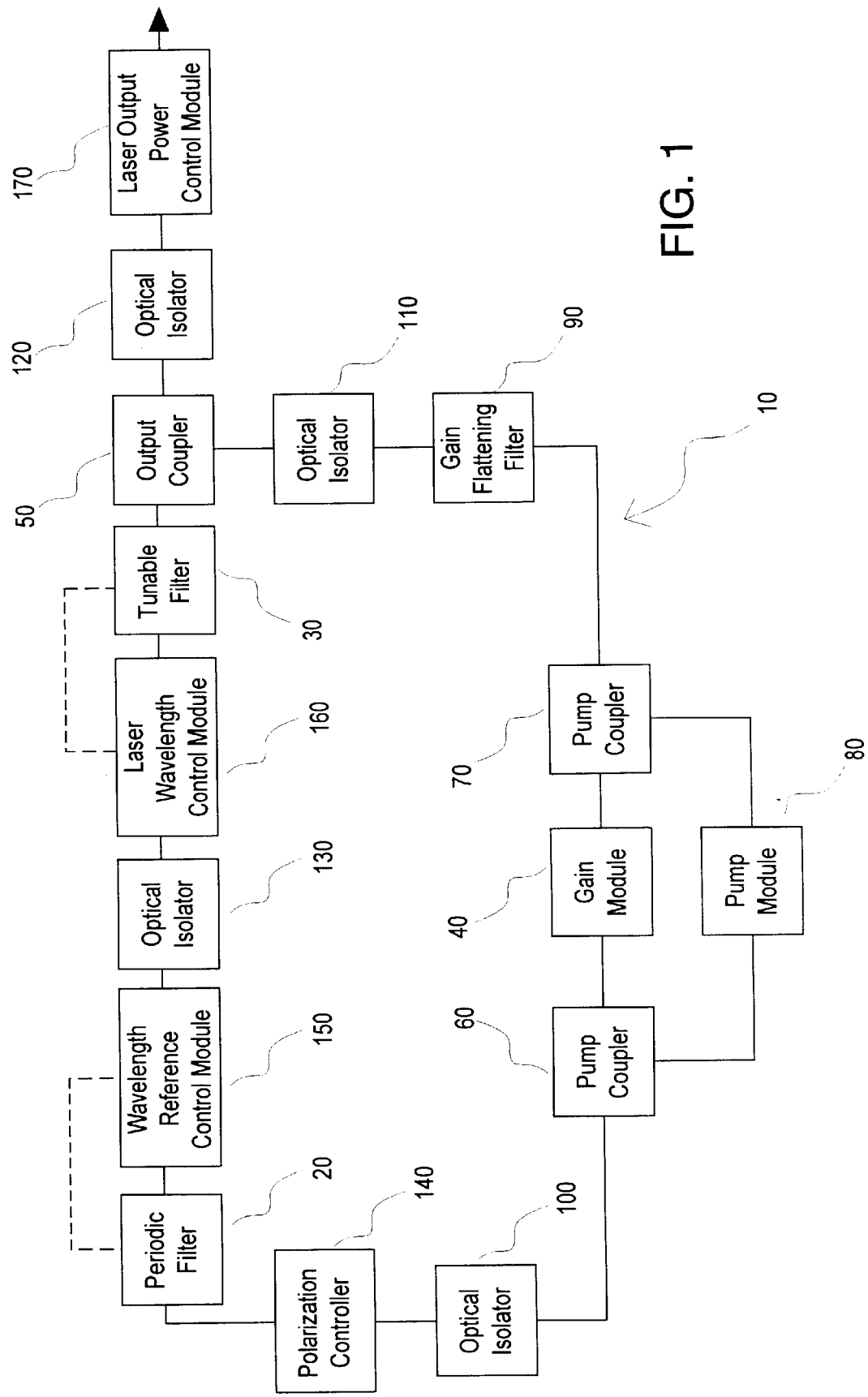
FIG. 1 is a schematic diagram of a presently preferred embodiment of a step-tunable fiber-optic ring laser according to the present invention.

FIG. 1 is a schematic diagram of a presently preferred configuration for a step-tunable fiber-optic ring laser 10 according to the present invention. The configuration of FIG. 1 preferably includes several cavity or resonator elements, as described below. While for the sake of illustration a specific ordering of elements is shown for the ring configuration described immediately below, it will be readily apparent to one having ordinary skill in the art that cavity elements may be placed within the cavity according to different positions other than those shown and described.

Figure 2:
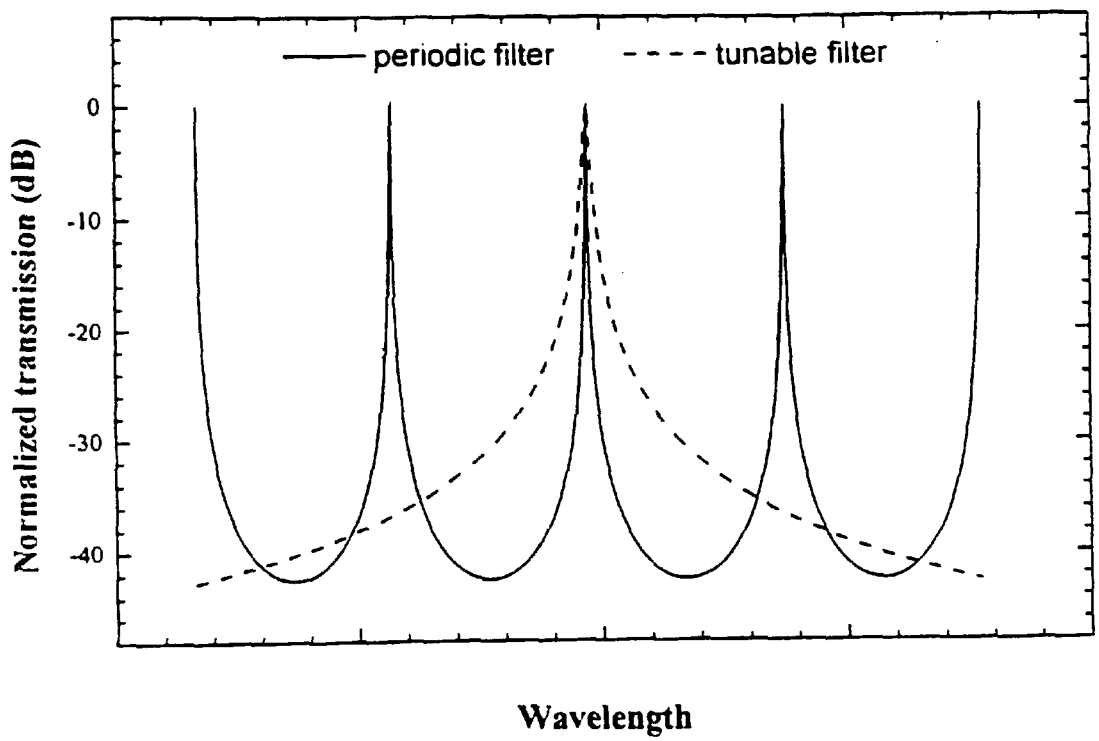
FIG. 2 illustrates the spectral overlap of the passbands of the electrically tunable filter and the periodic filter according to the present invention.

As shown, the arrangement of FIG. 1 includes a periodic filter 20. The periodic filter 20 is a filter which has high transmissivity for light with frequency within certain frequency bands, i.e., passbands, at approximately constant frequency spacing. In the preferred embodiment the periodic filter 20 has passbands spaced apart at a frequency spacing of 200 GHz or a sub-multiple of that spacing, such as 100 GHz, 50 GHz, 25 GHz, 12.5 GHz, or other. The periodic filter 20 limits the possible lasing wavelenghts of the step-tunable ring laser 10 by introducing lower optical loss at the passbands as compared to other wavelengths, with the effect of precluding laser action at the low transmissivity bands. In the preferred embodiment, the center wavelength of one, or more, of the passbands may be kept within certain values of a predetermined frequency so as to obtain a laser output with a wavelength according to International Telecommunications Union (ITU) frequency grid recommendations, or according to any other set of wavelengths. The solid line in FIG. 2 illustrates a calculated normalized transmission characteristic of one such periodic filter. For certain applications the periodic filter 20 may be tunable by electrical or mechanical means.

The periodic filter 20 is optically coupled to an electrically tunable filter 30. Here and elsewhere, "optically coupled" means arranged so that optical radiation may pass from one to the other or vice versa, and possibly passing through one or more active or passive intermediate optical elements along the way. Also, in the figures it will be understood that the solid lines interconnecting the components are intended to depict optical paths. In the presented preferred embodiments the optical interconnecting path is defined with optical fiber. Also, in the figures it will be understood that the dashed lines interconnecting the components are intended to depict electrical connections.

The electrically tunable filter 30 is preferably an optical filter with a frequency passband that is electrically controlled in terms of center wavelength. In the presently preferred embodiment of the invention it is preferred to use a tunable filter with a passband bandwidth which is small enough that laser oscillation occurs only for wavelengths within one of the passbands of the periodic filter 20. It will be readily apparent to one having ordinary skill in the art that the passband bandwidth of the tunable filter 30 must be lower than the periodic filter 20 passband frequency spacing. The dashed line in FIG. 2 illustrates the calculated transmission characteristic of a such tunable filter.

Figure 3:
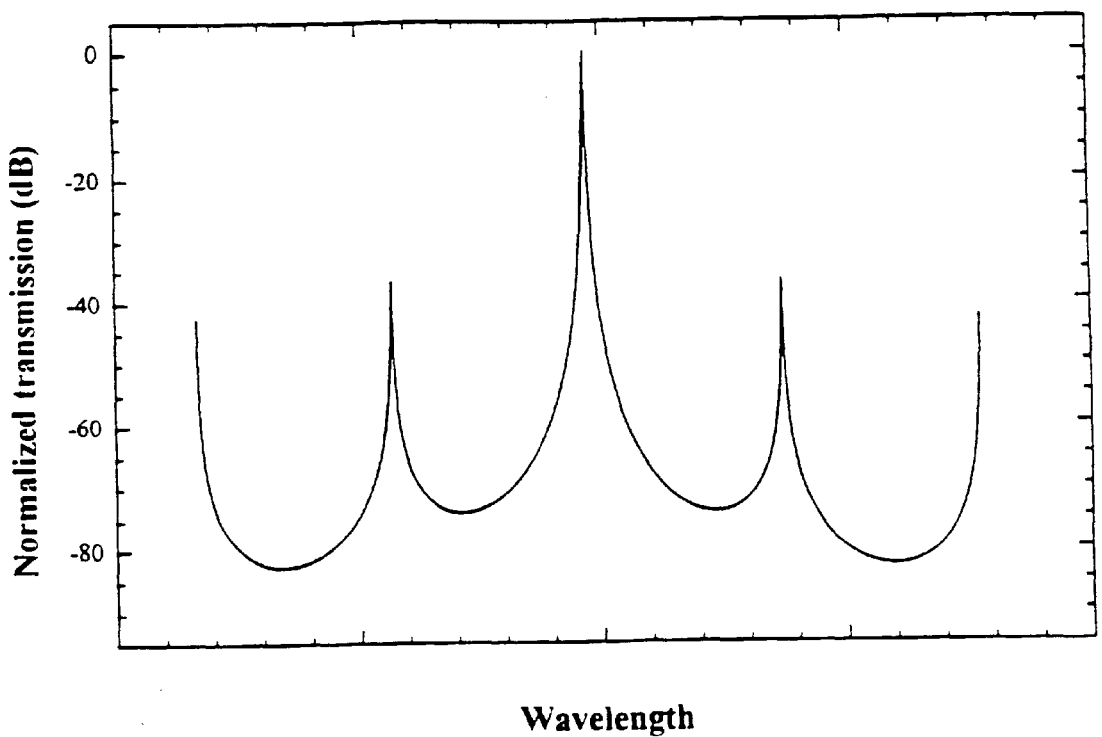
FIG. 3 illustrates the combined spectral response of the periodic and tunable filters according to the present invention.

According to the present invention, the overlap of the passbands of the electrically tunable filter 30 and the periodic filter 20 defines a passband with transmissivity higher than any other frequency band within the frequency operating range of the fiber laser 10, therefore restricting the output wavelength of the fiber laser 10 to within such high-transmissivity passband. FIG. 3 illustrates a calculated combined transmission curve of a such tunable filter 30 and a such periodic filter 20 showing the resulting high-transmissivity passband. It will be readily apparent to one having ordinary skill in the art that the free-spectral range (FSR) of the tunable filter 30 must be such that only one high-transmissivity passband exists within the frequency operating range of the fiber laser 10.

By electrically controlling the frequency position of the passband of the electrically tunable filter 30 an overlap with a different passband of the periodic filter 20 can be obtained, therefore defining a different high-transmissivity passband and allowing laser oscillation at a wavelength within a different passband of the periodic filter 20. This is termed step-tuning the laser.

The presently preferred embodiment, as depicted in FIG. 1, also includes a gain module 40. It is presently preferred that this gain module 40 be made up of a length of rare earth doped optical fiber. More preferably, in a preferred embodiment the gain module 40 includes a length of erbium-doped optical fiber. It will, however, be apparent to one of ordinary skill in the art that other rare earth and transition metal materials may be used as dopants or co-dopants of the optical fiber in the gain module 40, in concentrations which may be varied across the radial and/or longitudinal profile of the fiber. It will also be apparent to one of ordinary skill in the art that gain module 40 may be made up of other optical amplifiers, such as: fiber Raman amplifier, semiconductor optical amplifier, rare-earth doped waveguide amplifier or doped solid-state amplifier. Also, supplementary gain modules can be added to the laser 10 in series or parallel with the gain module 40 in order to extend the tuning range and/or to increase the optical output power of the laser 10.

Pump couplers 60 and 70 are used to couple the output of the pump module 80 into the fiber laser 10. It is presently preferred that the couplers 60 and 70 be fiber-fused wavelength division multiplexer couplers which couple the optical radiation from the pump module 80 into the laser 10. However, coupling the pump laser light radiation into the ring laser 10 is not limited to this method and may be achieved by any of several other methods known in the art. The pump module 80 may be any one of many commonly available pump laser sources, including an array of pump laser diodes arranged according to a pump redundancy scheme. In the presented preferred embodiment the pump module 80 is constituted by two laser diodes providing both co-propagating and contra-propagating pump radiation into gain module 40.

The arrangement of FIG. 1 may also include an optical gain-flattening filter 90 arranged within the laser resonator with the purpose of obtaining an approximately constant laser output power for all the specified wavelengths of operation of the laser 10. The optical gain-flattening filter 90 has a wavelength-dependent loss curve which compensates the wavelength-dependent gain curve of the gain module 40, in the sense that the loss curve of the gain-flattening filter 90 when combined with the gain curve of the gain module 40 results in an approximately flat gain curve for the operation wavelength range of laser 10. In a presently preferred embodiment the gain-flattening filter 90 may include a set of long-period fiber gratings with a compensating loss curve, in the sense just described. Also, the gain-flattening filter 90 can be inserted into the gain module 40. In a preferred embodiment the position of the gain-flattening filter 90 within the gain module 40 is such that it ensures minimum excess insertion loss.

In the presently preferred embodiment, as depicted in FIG. 1, the laser 10 includes optical isolators 100, 110, 120 and 130 to ensure unidirectional laser oscillation and to prevent unwanted reflections induced by elements inside or outside the cavity from adversely affecting the operation of the step-tunable fiber-optic ring laser 10. It will, however, be apparent to one of ordinary skill in the art that, in certain applications, the position and/or number of optical isolators may be changed to obtain enhanced performance of laser 10. It is also possible that a design for the gain module 40 may already include one or two optical isolators, which may render at least some of the shown optical isolators unnecessary.

The arrangement of FIG. 1 includes an output coupler 50. The output coupler 50 is preferably a fiber-fused coupler. The output coupler 50 is used to provide a useful output from the ring fiber laser 10. In the presented preferred embodiment, the coupling ratio of the output coupler 50 is such that it maximizes the optical output power. As an illustrative example, the output coupler 10 may be a 10/90 fiber-fused coupler.

It will be readily apparent to one having ordinary skill in the art that the exact output wavelength of the fiber laser 10 will be determined by the wavelength dependence of both the overall cavity loss and the gain in the gain module 40, and by mode-pulling effects and laser instabilities of various natures. It will, also, be readily apparent to one having ordinary skill in the art that within the passband defined by the overlap of the passbands of the electrically-tunable filter 30 and the periodic filter 20 several cavity longitudinal modes may attain laser threshold, resulting in laser emission composed of several nearly equally spaced wavelengths. For certain applications, the cavity of laser 10 may be designed to ensure single longitudinal mode operation, increasing side-mode suppression and reducing the emission line-width and noise. In the presented preferred embodiment of the invention, depicted in FIG. 1, the total length of the laser resonator 10 is defined such that its longitudinal spectral mode structure in combination with the spectral characteristics of the intracavity filters restricts the laser emission to only one well-defined cavity longitudinal mode. It will be readily apparent to one having ordinary skill in the art that both homogeneous line-broadening of the gain medium used in gain module 40 and unidirectional laser oscillation can further assist single longitudinal mode operation.

A polarization controller 140, which may include a polarizer, can be used within laser 10 in order to optimize the laser operation whenever polarization-dependent elements are used within the laser cavity and/or, for certain applications, to define a specific state-of-polarization for the output radiation of the laser 10.

Figure 4:
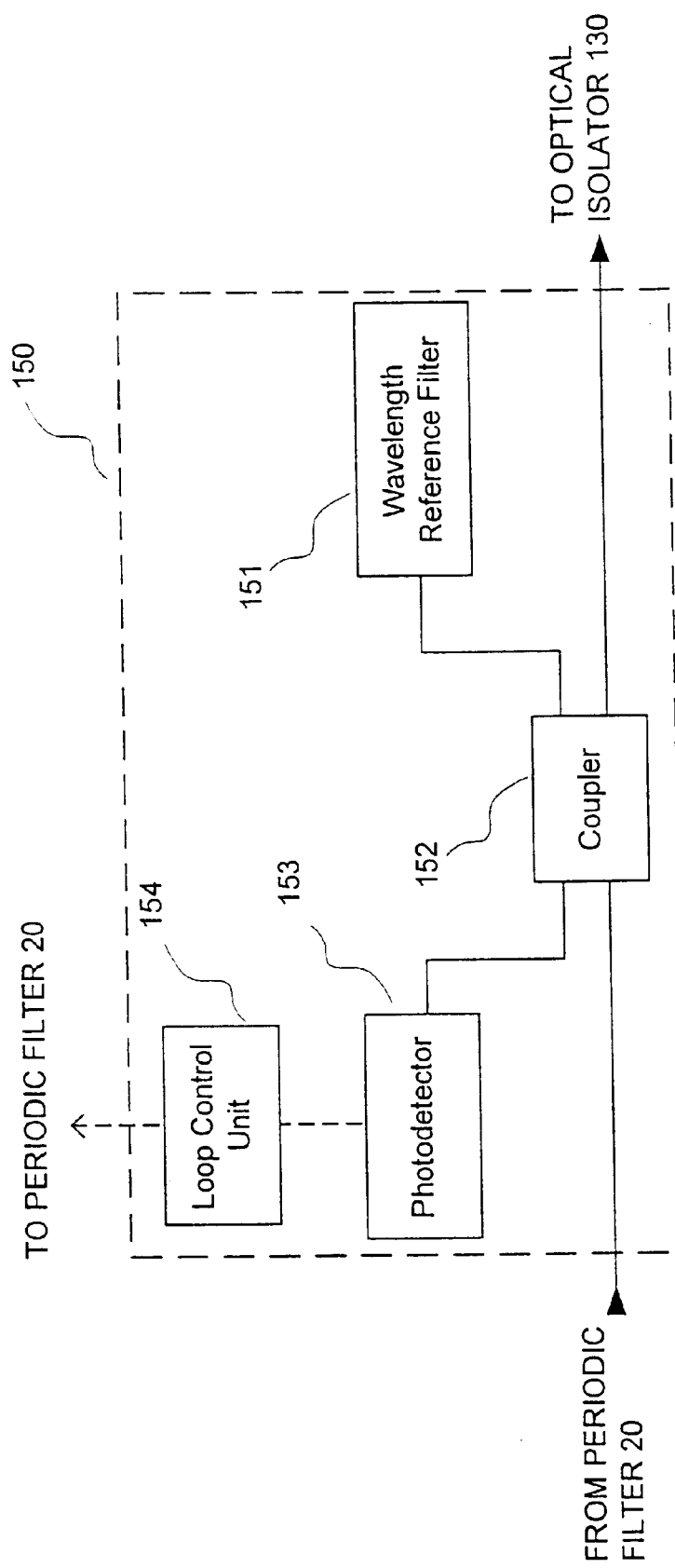
FIG. 4 is a schematic diagram of a presently preferred embodiment of a wavelength reference control module according to the present invention.

In another embodiment of the invention, a wavelength reference control module 150 can be used, as depicted in FIG. 1, in order to lock the spectral response of the periodic filter 20 to the ITU wavelength grid. In the presently preferred embodiment of the invention, the wavelength reference control module 150 includes, as shown in FIG. 4, a wavelength reference filter 151, a coupler 152 and a photodetector 153. The coupler 152 is inserted in-line with the ring cavity laser 10, optically coupled to the other elements in the resonator, with the purpose of extracting a small fraction of the laser radiation from the laser cavity. As an illustrative example, the coupler 152 may be a 01/99 fiber-fused coupler. However, extracting a fraction of the laser light radiation is not limited to this method and may be achieved by any of other methods known in the art. The narrow-band optical signal coupled by the wavelength reference filter 151 to the detector 153 provides a stable wavelength reference suitable for closed-loop operation. In the closed-loop mode of operation long-term wavelength drift, caused by thermal and/or mechanical-induced fluctuations, in the periodic filter spectral response are prevented by the loop control unit 154. FIG. 4 illustrates a configuration using a reflective wavelength reference filter. As an illustrative example, the wavelength reference filter 151 may be a temperature-compensated fiber Bragg grating. It will, however, be apparent to one of ordinary skill in the art that other stabilized wavelength reference filters other than this one may also be used, such as transmission notch filters.

Figure 5:
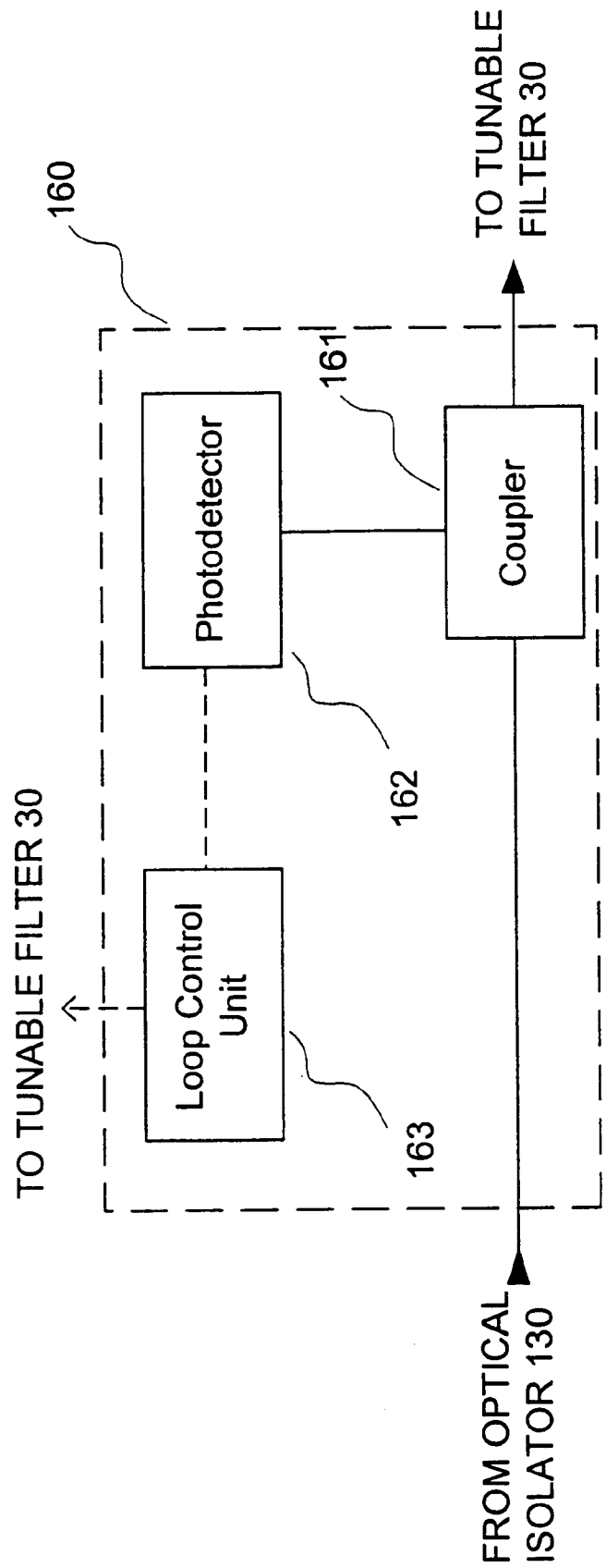
FIG. 5 is a schematic diagram of a presently preferred embodiment of a laser wavelength control module according to the present invention.

In another embodiment of the invention, a laser wavelength control module 160 can be inserted in-line with the laser 10 cavity, as depicted in FIG. 1, in order to set and maintain the output wavelength of the fiber laser 10 according to a predetermined value. In the presently preferred embodiment of the invention, the laser wavelength control module 160 uses, as shown in FIG. 5, a coupler 161 to extract a fraction of the fiber laser 10 optical radiation, which is optically coupled to a photodetector 162. As an illustrative example, the coupler 161 may be a 01/99 fiber-fused coupler. However, extracting a fraction of the output laser light radiation is not limited to this method and may be achieved by any of other methods known in the art. The loop control unit 163 uses the electric reference signal provided by the photodetector 162 to ensure closed-loop control of the tunable filter 30 spectral response. In the closed-loop mode of operation stable and optimum overlap between the spectral responses of both tunable filter and periodic filter is assured.

Figure 6:
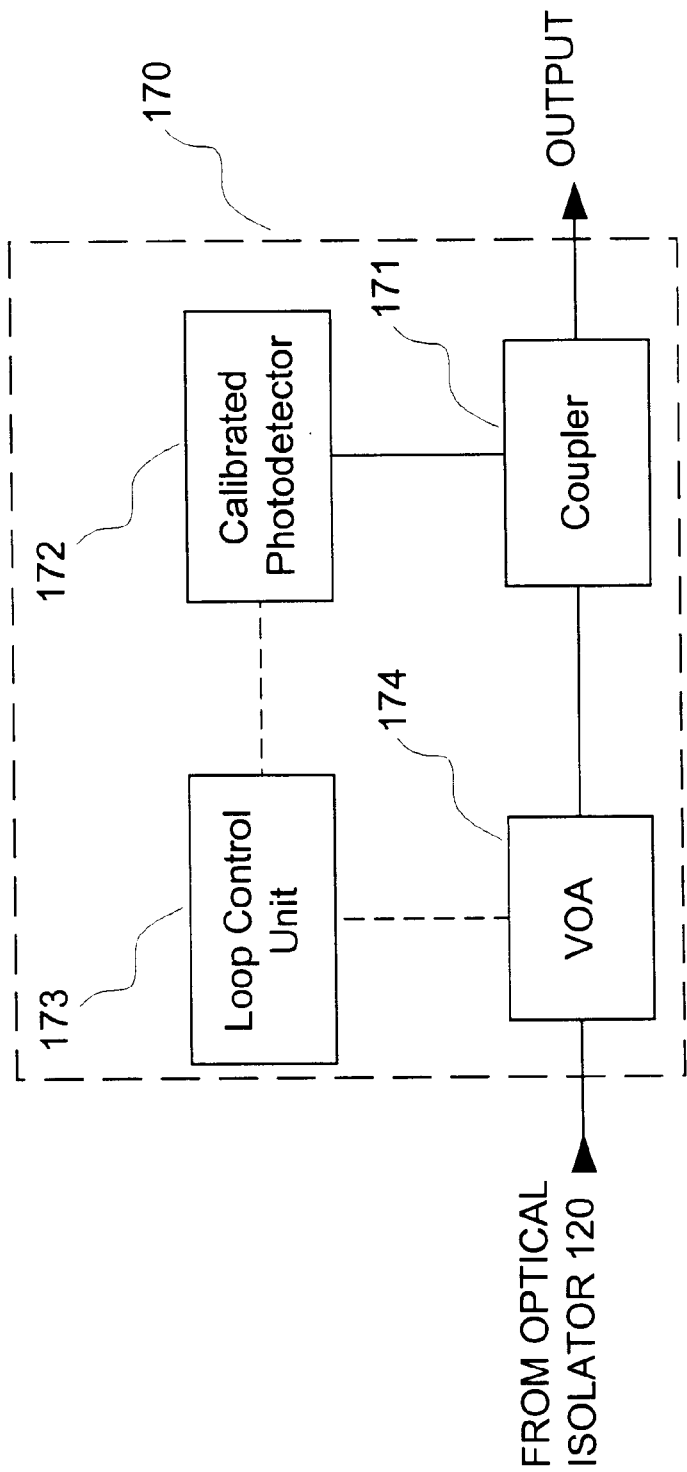
FIG. 6 is a schematic diagram of a presently preferred embodiment of a laser output power control module according to the present invention.

In another embodiment of the invention, a laser output power control module 170 can be inserted in-line with the output of laser 10, as depicted in FIG. 1, in order to set and maintain the optical output power of the fiber laser 10 according to a predetermined value. In the presently preferred embodiment of the invention, the laser output power control module 170 uses, as shown in FIG. 6, a coupler 171 to extract a fraction of the fiber laser 10 optical output power, which is optically coupled to a calibrated photodetector 172. As an illustrative example, the coupler 171 may be a 01/99 fiber-fused coupler. However, extracting a fraction of the output laser light radiation is not limited to this method and may be achieved by any of other methods known in the art. The loop control unit 173 uses the electric reference signal provided by the calibrated photodetector 172 to ensure closed-loop control of an in-line variable optical attenuator (VOA) 174. In the closed-loop mode of operation laser output power instabilities caused by fluctuations in laser 10 is prevented. The laser output power control module 170 may further render optional the use of a gain-flattening filter, such as gain-flattening filter 90, in order to provide wavelength independent laser output power as required in some applications.

In the preferred embodiments of the ring laser 10 cavity described above, the periodic filter 20 is preferably a fiber or fiber-coupled Fabry-Pérot micro-etalon transmission filter. It will be readily apparent to one having ordinary skill in the art, however, that the specific choice of a component for implementing the functions of the periodic filter 20 is not limited to such a component but instead may be a transmission or reflection filter made by any other means known in the art, such as: discrete set of fiber Bragg gratings, sampled fiber Bragg gratings, long-period fiber gratings, fiber interferometers, fiber wavelength-dependent couplers, fiber or fiber-coupled Fabry-Pérot etalon filters, integrated-optic devices, quantum-well structures, and semiconductor waveguides.

In the preferred embodiments described above, the electrically-tunable filter 30 is preferably a fiber or fiber-coupled Fabry-Pérot filter. It will be readily apparent to one having ordinary skill in the art, however, that the specific choice of a component for implementing the functions of the electrically-tunable filter 30 is not limited to such a component but instead may be a transmission or reflection filter made by any other means known in the art, such as: fiber Bragg gratings, long-period fiber gratings, fiber interferometers, fiber wavelength-dependent couplers, angle dielectric filter stacks, acousto-optic filters, quantum-well structures, semiconductor waveguides, and integrated optic devices.

In other embodiments of this invention the ring laser 10 cavity may include at least one optical circulator and/or an optical switch in conjunction with any of the periodic and/or tunable filters referred above.

In the presently preferred embodiment, components in the laser 10 resonator are preferably optically coupled using lengths of single-mode fiber. For certain applications, the laser 10 resonator may comprise fiber lengths, in part or in total, made of polarization maintaining single-mode fiber. Also, for certain applications, the laser 10 resonator may also or alternatively include lengths of non-single-mode fiber.

As mentioned, the cavity elements in the laser 10 resonator may be placed within the cavity accordingly to different positions other than those shown in the diagrams, which are to be regarded as illustrative examples of such arrangements.

It will also be readily apparent to one having ordinary skill in the art that the presented invention may be implemented in a linear laser resonator configuration.

The invention has been described herein using specific embodiments for the purposes of illustration only. It will be readily apparent to one of ordinary skill in the art, however, that the principles of the invention can be embodied in other ways. Therefore, the invention should not be regarded as being limited to the specific embodiments disclosed herein, but instead as being fully commensurate in scope with the following claims.

We claim:

1. Apparatus comprising:
    a pump module for generating pump radiation;
    a ring laser resonator;
    an input coupler for optically coupling said pump radiation into said laser resonator; and
    an output coupler for optically coupling laser radiation out of said laser resonator,
    said ring laser resonator including an optically-coupled arrangement of:
        a gain module which is pumped by said pump radiation, said pump radiation exciting said gain module thereby achieving lasing action in said laser resonator;
        a periodic filter;
        a wavelength reference control module, said wavelength reference control module stabilizing a spectral response of said periodic filter to a wavelength grid, and
        a tunable filter.

2. Apparatus as claimed in claim 1 further comprising single-mode optical fiber to optically couple said gain module, said periodic filter, said wavelength reference control module, and said tunable filter.

3. Apparatus as claimed in claim 1 further comprising polarization maintaining single-mode optical fiber to optically couple said gain module, said periodic filter, said wavelength reference control module, and said tunable filter.

4. Apparatus as claimed in claim 1 wherein said gain module comprises an optical amplifier.

5. Apparatus as claimed in claim 4 wherein said optical amplifier is an erbium-doped fiber amplifier.

6. Apparatus as claimed in claim 1 wherein said periodic filter is a transmission filter.

7. Apparatus as claimed in claim 6 wherein said periodic filter comprises one of a fiber Fabry-Pérot etalon filter and a fiber-coupled Fabry-Pérot micro-etalon filter.

8. Apparatus as claimed in claim 6 wherein said periodic filter is a transmission filter with spectral wavelengths defined according to ITU grid wavelengths for WDM.

9. Apparatus as claimed in claim 1 wherein said periodic filter is a reflection filter.

10. Apparatus as claimed in claim 9 wherein said periodic filter comprises one of a sampled fiber Bragg grating and a set of sampled fiber Bragg gratings.

11. Apparatus as claimed in claim 1 wherein said wavelength grid comprises ITU grid wavelengths for WDM.

12. Apparatus as claimed in claim 1 wherein said periodic filter is one of a fiber periodic filter and a fiber-coupled periodic filter.

13. Apparatus as claimed in claim 1 wherein said periodic filter is tunable.

14. Apparatus as claimed in claim 13 wherein said periodic filter is an electrically mechanically tunable periodic filter.

15. Apparatus as claimed in claim 1 wherein said tunable filter is electrically tunable.

16. Apparatus as claimed in claim 15 wherein said tunable filter comprises one of a fiber Fabry-Pérot filter and a fiber-coupled Fabry-Pérot filter.

17. Apparatus as claimed in claim 1 wherein said tunable filter is one of a fiber tunable filter and a fiber-coupled tunable filter.

18. Apparatus as claimed in claim 1 wherein said resonator comprises means for ensuring unidirectional laser oscillation.

19. Apparatus as claimed in claim 18 wherein said means for ensuring unidirectional laser oscillation comprises an optical isolator positioned at one end of said gain module.

20. Apparatus as claimed in claim 1 wherein said gain module comprises means for preventing reflections from other resonator components from disturbing laser emission.

21. Apparatus as claimed in claim 20 further comprising a first optical isolator positioned at one end of said gain module and wherein said means for preventing reflections from other resonator components from disturbing laser emission further comprises a second optical isolator positioned at the opposite end of said gain module relative to said first optical isolator.

22. Apparatus as claimed in claim 1 wherein said resonator further includes a wavelength dependent filter, said wavelength dependent filter having a spectral loss characteristic complementary to and compensating for a gain profile of said gain module so that a net gain of said gain profile and said loss characteristic is approximately constant across an operating wavelength range.

23. Apparatus as claimed in claim 1 further comprising means for preventing inter-etalon interactions between said periodic filter and said tunable filter.

24. Apparatus as claimed in claim 23 wherein said means for preventing inter-etalon interactions further comprises an optical isolator.

25. Apparatus as claimed in claim 1 wherein said resonator further includes a polarization controller.

26. Apparatus as claimed in claim 1 wherein said input coupler comprises a fiber-fused wavelength division multiplexer.

27. Apparatus as claimed in claim 1 wherein said output coupler comprises a fiber-fused coupler.

28. Apparatus as claimed in claim 1 wherein said pump module comprises at least one pump laser diode.

29. Apparatus as claimed in claim 28 wherein said pump module comprises multiple pump laser diodes.

30. Apparatus as claimed in claim 1 further comprising means for periodic filter spectral response stabilization.

31. Apparatus as claimed in claim 1 wherein said wavelength reference control module comprises a fiber-fused coupler optically coupled to said ring laser resonator, a photodetector optically coupled to said fiber-fused coupler, and a wavelength reference filter optically coupled to said fiber-fused coupler.

32. Apparatus as claimed in claim 31 wherein said wavelength reference filter is a temperature-compensated fiber Bragg grating.

33. Apparatus as claimed in claim 1 further comprising means for definition and stabilization of laser oscillation wavelength.

34. Apparatus as claimed in claim 33 wherein said means for definition and stabilization of laser oscillation wavelength further comprises a laser wavelength control module.

35. Apparatus as claimed in claim 34 wherein said laser wavelength control module comprises a fiber-fused coupler optically coupled to said ring laser resonator and a photodetector optically coupled to said fiber-fused coupler.

36. Apparatus as claimed in claim 1 further comprising means for laser output power definition and stabilization.

37. Apparatus as claimed in claim 36 wherein said means for laser output power definition and stabilization further comprises a laser output power control module.

38. Apparatus as claimed in claim 37 wherein said laser output power control module comprises a fiber-fused coupler optically coupled to said laser radiation out of said laser resonator, a calibrated photodetector optically coupled to said fiber-fused coupler, and an electrically variable optical attenuator optically coupled to said laser radiation out of said laser resonator.

39. A laser resonator comprising:

a gain module which is pumped by pump radiation, said pump radiation exciting said gain module thereby achieving lasing action in said laser resonator;

a periodic filter optically coupled to said gain module;

a wavelength reference control module, said wavelength reference control module stabilizing a spectral response of said periodic filter to a wavelength grid; and an electrically tunable filter optically coupled to said periodic filter.

40. A method of generating a laser output at any one of a set of discrete frequencies, said method comprising the steps of:

providing pump energy to a gain medium in a laser cavity to excite a laser resonance;

stabilizing a spectral response of a periodic filter to said set of discrete frequencies;

filtering the laser resonance using said periodic filter to limit the possible frequencies to said frequencies in said set; and filtering the laser resonance using a tunable filter to limit the possible frequencies to one of said frequencies in said set, wherein said step of filtering comprises the step of tuning said tunable filter to select one of said frequencies in said set as an output frequency.

41. A method of controlling a spectral response of a periodic filter, said method comprising the steps of:

providing a fraction of radiation in a laser cavity to illuminate a wavelength reference filter;

monitoring the wavelength reference filter response with a photodetector;

controlling the spectral response of the periodic filter by means of a loop control unit; and operating the loop control unit in a closed-loop operation.

42. A method of controlling an output wavelength of a laser, said method comprising the steps of:

providing a fraction of radiation in a laser cavity to illuminate a photodetector;

controlling the spectral response of a tunable filter by means of a loop control unit; and operating the loop control unit in a closed-loop operation.

43. A method of controlling output power of a laser, said method comprising the steps of:

providing a fraction of the radiation in a laser cavity to illuminate a calibrated photodetector;

controlling a variable optical attenuator insertion loss by means of a loop control unit; and operating the loop control unit in closed-loop operation.

* * * * *